(12) United States Patent
Selstad

(10) Patent No.: US 9,151,229 B2
(45) Date of Patent: Oct. 6, 2015

(54) HIGH PRESSURE TURBINE SPEED CALCULATION FROM FUEL SYSTEM HYDRAULIC PRESSURES

(71) Applicant: United Technologies Corporation, Hartford, CT (US)

(72) Inventor: Tyler J. Selstad, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 478 days.

(21) Appl. No.: 13/718,066

(22) Filed: Dec. 18, 2012

(65) Prior Publication Data
US 2014/0165579 A1   Jun. 19, 2014

(51) Int. Cl.
F02C 7/22  (2006.01)
F02C 9/26  (2006.01)

(52) U.S. Cl.
CPC .............. *F02C 9/26* (2013.01); *F05D 2260/80* (2013.01)

(58) Field of Classification Search
CPC ............. F02C 7/22; F02C 7/236; F02C 9/28; F23R 3/28; F23K 2401/201; F23K 2900/05001; F04D 27/00–27/0292
USPC ................. 60/734, 784, 779, 800, 801, 802
See application file for complete search history.

(56) References Cited

U.S. PATENT DOCUMENTS

| | | | | |
|---|---|---|---|---|
| 3,913,314 | A * | 10/1975 | Yannone et al. | 60/790 |
| 4,989,411 | A | 2/1991 | Hoopes et al. | |
| 5,220,793 | A | 6/1993 | McGlone et al. | |
| 5,240,380 | A * | 8/1993 | Mabe | 417/43 |
| 5,685,268 | A | 11/1997 | Wakemen | |
| 5,775,090 | A * | 7/1998 | Skarvan | 60/773 |
| 6,182,438 | B1 * | 2/2001 | Weber | 60/778 |
| 2006/0260306 | A1 * | 11/2006 | Henn et al. | 60/600 |
| 2007/0175449 | A1 * | 8/2007 | Mahoney et al. | 123/454 |
| 2009/0274565 | A1 * | 11/2009 | White | 417/282 |
| 2010/0257867 | A1 | 10/2010 | Aurousseau et al. | |

FOREIGN PATENT DOCUMENTS

EP   0185600 A1   6/1986

OTHER PUBLICATIONS

International Search Report and Written Opinion for related International Application No. PCT/US13/70728; report dated Mar. 12, 2014.

* cited by examiner

*Primary Examiner* — Steven Sutherland
(74) *Attorney, Agent, or Firm* — Miller, Matthias & Hull LLP

(57) ABSTRACT

The speed of a high-pressure turbine of a gas turbine engine may be determined using known centrifugal pump affinity relationships for a fuel pressure apparatus, fuel pressure apparatus input and output pressures, and gear ratios for a mechanical linkage between the high-pressure turbine and the fuel pressure apparatus. The technique avoids wear-related variations in gas pressure based measurements and also applies to fuel pressure apparatus using both single pump and multiple pump configurations.

19 Claims, 5 Drawing Sheets

HIGH PRESSURE TURBINE SPEED CALCULATION FROM FUEL SYSTEM HYDRAULIC PRESSURES

FIELD OF THE DISCLOSURE

The subject matter of the present disclosure generally relates to gas turbine engines. More particularly, the subject matter of the current disclosure relates to calculating the high pressure turbine speed in a gas turbine engine.

BACKGROUND OF THE DISCLOSURE

Gas turbine engines are complex and finely tuned machines. Generally, such an engine is composed of a low pressure compressor and an associated low pressure turbine, the speed of the low pressure turbine is typically designated N1. The gas turbine engine also includes a high pressure compressor and associated high pressure turbine, the speed of which is typically designated N2.

Accurate knowledge of N2 is an important factor to maintaining efficient and high performance in gas turbine engines. However, N2 speed is difficult to measure directly. The most common indirect measures involve measuring various engine air pressures and interpolating N2. This process can produce wide variations in results, particularly over time due to engine wear.

SUMMARY OF THE DISCLOSURE

According to one embodiment of the invention, a method of determining a speed of a high pressure turbine in a gas turbine engine includes providing a nominal output fuel pressure of a fuel pressure apparatus when the high pressure turbine is operating at a nominal speed, determining a first fuel pressure at an input of a fuel pressure apparatus that supplies fuel to a combustion chamber of the gas turbine engine, determining a second fuel pressure at an output of the fuel pressure apparatus and calculating the speed of the high pressure turbine as a quadratic relationship of the input pressure of the fuel pressure apparatus and the output pressure of the fuel pressure apparatus.

The method also optionally includes a configuration where the fuel pressure apparatus is a single stage centrifugal pump. The method further optionally includes calculating a shaft speed of the single stage pump, where calculating the speed of the high pressure turbine is a function of the shaft speed and a gear ratio of a gear box coupling the high pressure turbine and the single stage pump. In the embodiment, the fuel pressure apparatus may also be a multiple stage pump including a plurality of centrifugal pumps with each stage being driven at a common speed proportional to a gear ratio of a gear box coupling the high pressure turbine and the multiple stage pump.

In another aspect, a system for determining a speed of a high pressure turbine in a gas turbine engine includes a fuel supply, a fuel pressure apparatus including a drive shaft, an input hydraulically coupled to the fuel supply and an output of the fuel pressure apparatus, and a combustion chamber of the gas turbine engine hydraulically coupled to the output of the fuel pressure apparatus. The system may also include a high pressure turbine of the gas turbine engine mounted proximate to the combustion chamber, a drive unit mechanically coupling the high pressure turbine to the drive shaft of the fuel pressure apparatus and a processing unit operably coupled to the input of the fuel pressure apparatus and to the output of the fuel pressure apparatus, where the processing unit calculates a speed of the high pressure turbine as a quadratic function of a difference of the pressure between the input and the output of the fuel pressure apparatus.

The system may also optionally include a metering unit hydraulically coupled between the output of the fuel pressure apparatus and the combustion chamber. The drive unit may optionally include a gear box so that the processing unit calculates the speed of the high pressure turbine as a function of a gear ratio of the gear box. The fuel pressure apparatus may be have at least one centrifugal pump and the processing unit may include a computer-readable memory that stores centrifugal pump affinity data for the at least one centrifugal pump.

In this embodiment, the computer-readable memory may also optionally store an equation for the quadratic function, for example, $$N2 = \sqrt{\frac{(PF1 - PF0)N_{ref}^2}{K}}$$

for a single stage pump, where N2 is the high pressure turbine speed, PF0 is a fuel pressure at the input of the fuel pressure apparatus, PF1 is the pressure at the output of the fuel pressure apparatus, $N_{ref}$ is a reference speed of the high pressure turbine and K is a pump constant. In another embodiment, the quadratic equation may be $$N2 = \sqrt{\frac{(PFn - PF0)N_{ref}^2}{K_1 + K_2 + \ldots K_n}}$$

for a multiple stage pump, where N2 is the high pressure turbine speed, PF0 is a fuel pressure at the input of the fuel pressure apparatus, PFn is the pressure at an output of a final stage of the fuel pressure apparatus, $N_{ref}$ is a reference speed of the high pressure turbine and $K_1$ to Kn are pump constants for respective pump stages of the fuel pressure apparatus. The system may also include a first pressure sensor measuring pressure at the input of the fuel pressure apparatus and a second pressure sensor measuring pressure at the output of the fuel pressure apparatus.

In still another embodiment, a method implemented by a processing unit of a gas turbine engine executing instructions stored in a computer-readable memory, where the method includes determining a first pressure at an input of a fuel pressure apparatus, determining a second pressure at an output of the fuel pressure apparatus, calculating a pressure difference between the input and the output of the fuel pressure apparatus, retrieving a constant corresponding to a nominal pressure difference and a nominal high pressure turbine speed, and calculating a high pressure turbine speed as a quadratic function of the pressure difference and the constant.

Calculating the high pressure turbine speed may optionally include adjusting the constant by a gear ratio of a gear box that mechanically couples the high pressure turbine to the fuel pressure apparatus. The high pressure turbine speed may be calculated as the square root of the pressure difference multiplied by a reference shaft speed squared divided by a pump constant. The method may also include configurations where the fuel pressure apparatus is a single stage centrifugal pump or a multiple stage centrifugal pump.

BRIEF DESCRIPTION OF THE DRAWINGS

So that the manner in which the above recited concepts of the present disclosure may be understood in detail, a more particular description is provided by reference to the embodiments which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

The present invention takes advantage of pump affinity characteristics to translate a fuel pressure difference across a fuel pump into shaft speed and from that to calculate N2 of a gas turbine engine using a known mechanical relationship.

Figure 1:
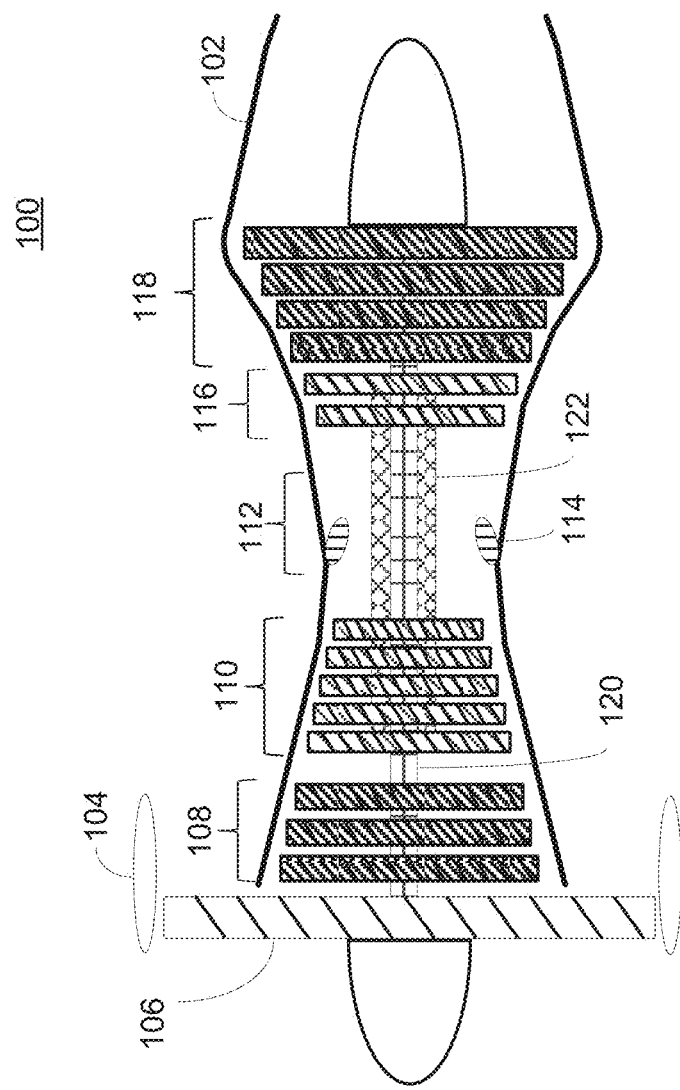
FIG. 1 illustrates major blocks of a gas turbine engine.

Referring to FIG. 1, an exemplary gas turbine engine 100 has a housing 102, a fan cowl 104, and an intake fan 106. The engine 100 may also include a low pressure compressor 108, a high pressure compressor 110, a combustion chamber 112 with burners 114. A high speed turbine or high pressure turbine 116 receives the hot gas of the combustion chamber 112. A low pressure turbine 118 receives the gas exhaust of the high pressure turbine 116. A low pressure turbine shaft 120 connects the low pressure turbine and low pressure compressor while a high pressure turbine shaft 122 connects the high pressure turbine 116 to the high pressure compressor 110. While this is a greatly simplified illustration, other significant and fundamental engine components that may be missing from this exemplary illustration, are not relevant to the instant disclosure relating to calculation of high pressure turbine speed.

Figure 2:
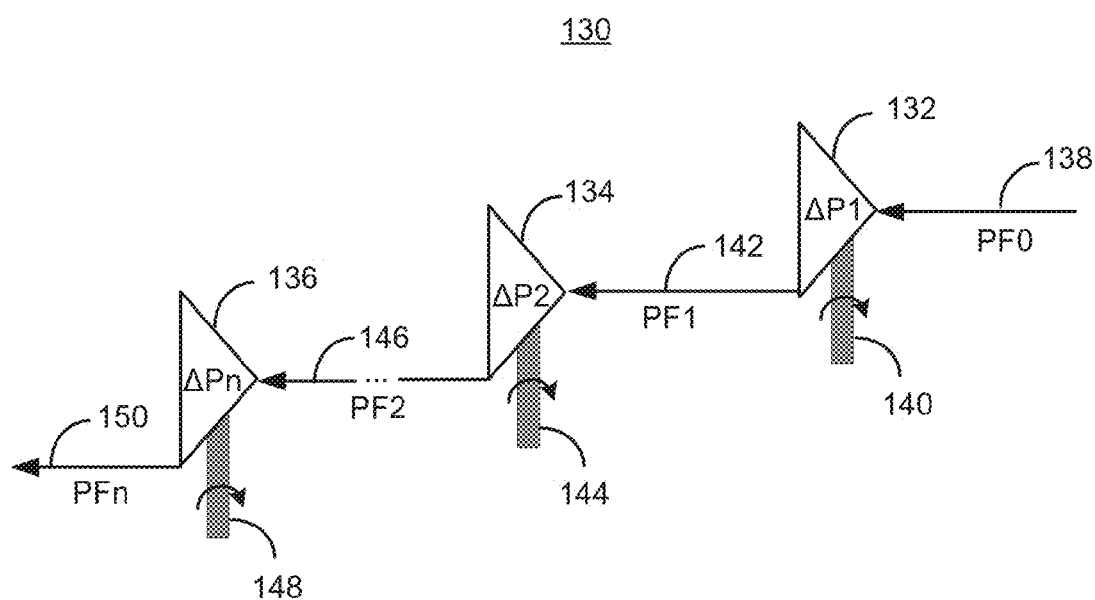
FIG. 2 is a simplified block diagram of a centrifugal pump configuration.

FIG. 2 illustrates a simplified block diagram of a centrifugal pump configuration 130. The configuration 130 includes three cascaded pumps, a first pump 132, a second pump 134, and a final pump 136. Each pump is driven by a respective shaft 140, 144, and 148. The first pump 132 has an input 138. A passage 142 connects an output of the first pump 132 to an input of the second pump 134. A passage 146 connects an output of the second pump 134 to an input of the final pump 136. An output 150 delivers the pressurized product, in the exemplary embodiment, jet fuel to a downstream component of the gas turbine engine.

In general, a centrifugal pump has a pressure difference between input and output described by a pump affinity equation:

$$\Delta P = K\left(\frac{N}{N_{ref}}\right)^2 \qquad \text{Eq. 1}$$

where $\Delta P$ is the pressure rise (i.e, increase) across the pump, K is a pump constant, N is a shaft speed of the pump and Nref is a reference shaft speed of the pump. The pump constant K is defined by:

$$K = \frac{Q}{nD^3} \qquad \text{Eq. 2}$$

where Q is the fluid flow rate through the pump, n is the shaft speed of the pump, and D is the diameter of the pump. Since D is fixed for a given pump, K defines the relationship between shaft speed and fluid flow rate. Pressure increase across the pump is then a function of the input pressure, shaft speed, and other pump characteristics, such as outlet pipe diameter.

Applying Eq. 1 to FIG. 1, a pressure difference between input 138 and output 142 of the first pump 132 is described by:

$$PF1 = PF0 + K\left(\frac{N}{N_{ref}}\right)^2 \qquad \text{Eq. 3}$$

Solving for shaft speed, N:

$$N = \sqrt{\frac{(PF1 - PF0)N_{ref}^2}{K}} \qquad \text{Eq. 4}$$

Eq. 4 describes the specific case of a single stage centrifugal pump. The addition of a second pump 134 driven at the same speed as the first pump 132, for example, having a common drive shaft is illustrated by Eqs. 5 and 6.

$$PF1 = PF0 + K_1\left(\frac{N}{N_{ref}}\right)^2 \qquad \text{Eq. 5}$$

$$PF2 = PF1 + K_2\left(\frac{N}{N_{ref}}\right)^2 \qquad \text{Eq. 6}$$

As above, Eq. 6 defines the shaft speed in terms of input and output pressure of the two pump implementation of pumps 132 and 134.

$$N = \sqrt{\frac{(PF2 - PF0)N_{ref}^2}{K_1 + K_2}} \qquad \text{Eq. 7}$$

Generalizing, an n stage pump as illustrated in FIG. 2 has a shaft speed defined by the pressure at the input 138 and the pressure at the output 150 and each pump's respective pump constants as:

$$N = \sqrt{\frac{(PFn - PF0)N_{ref}^2}{K_1 + K_2 + \ldots K_n}} \qquad \text{Eq. 8}$$

Figure 3:
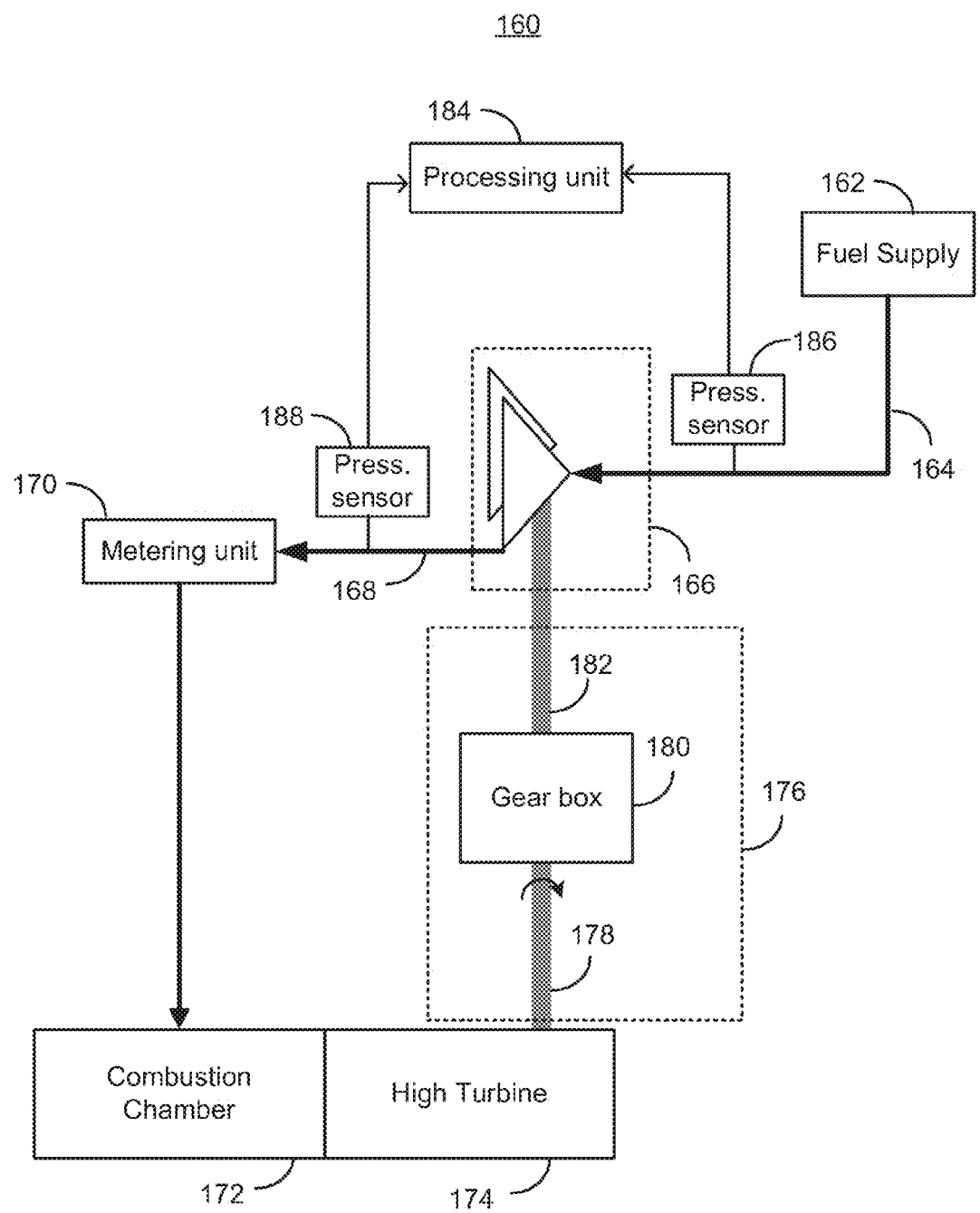
FIG. 3 is a block diagram of an exemplary fuel delivery system of a gas turbine engine using high pressure turbine speed calculation from fuel system hydraulic pressure.

FIG. 3 is a simplified and exemplary block diagram of a gas turbine engine 160 using high pressure turbine speed calculation from fuel system hydraulic pressure.

A fuel supply 162 provides fuel via an input line 164 to a fuel pressure apparatus 166. The fuel pressure apparatus 166 may be a single or multiple stage centrifugal pump, as discussed above with respect to FIG. 2. Pressurized fuel is delivered via output line 168 to a metering unit 170 that ultimately supplies fuel to the combustion chamber 172. As described in detail above with respect to FIG. 1, hot gases exhausting from the combustion chamber 172 spin the high pressure turbine 174.

The high pressure turbine may be mechanically coupled to a drive unit 176 that may include a first drive shaft 178, a gear box 180, and a second drive shaft 182. The first drive shaft 178 may be driven by the high pressure turbine 174 using a mechanical coupling with a known relationship between the rotational speed of the high pressure turbine 174 and the speed of first drive shaft 178. The gear box 180, or transmission, may translate the speed of shaft 178 so that shaft 182 turns at a second speed. The gear box 180 may use physical gears or may use a hydraulic transmission. Regardless of the embodiment, the relationship between the speed of shaft 178 and 182 may be determined and used in later calculations. The shaft 182 drives the fuel pressure apparatus 166. Because of the known relationships in the drive unit 176 between the speed of shaft 182 and the high pressure turbine 174, determining the speed of shaft 182 allows direct calculation of the speed of the high pressure turbine 174.

Using the pump affinity equations and known pump characteristics, the pressure rise across the fuel pressure apparatus 166 can be calculated as:

$$\Delta P_{FPU} = K_{FPU} \left( \frac{N}{N_{ref}} \right)^2 \qquad \text{Eq. 9}$$

For a multiple stage fuel pressure apparatus 166, that is, having more than one centrifugal pump, the pressure increase at each stage is cumulative as shown below in Eq. 10 for a two-stage pump with a main pump (m) and a boost pump (b):

$$PF2 = \left[ PF0 + K_b \left( \frac{N}{N_{ref}} \right)^2 \right] + K_m \left( \frac{N}{N_{ref}} \right)^2 \qquad \text{Eq. 10}$$

where $K_m$ is the pump constant of the main pump and $K_b$ is the pump constant of the boost pump and each stage is driven at the same speed, N. In an exemplary embodiment, the main pump pressure rise may be in a range of 1600-2400, pounds per square inch (psi). More particularly, the main pump pressure rise may be in a range of 190-210 psi. In an embodiment, the pressure rise of the boost pump may be in a range of 160-240 psi and more particularly in a range of 1900-2100 psi. Solving for shaft speed:

$$PF2 - PF0 = K_b \left( \frac{N}{N_{ref}} \right)^2 + K_m \left( \frac{N}{N_{ref}} \right)^2 \qquad \text{Eq. 11}$$

$$PF2 - PF0 = \left( \frac{N}{N_{ref}} \right)^2 (K_b + K_m) \qquad \text{Eq. 12}$$

$$N = \sqrt{\frac{(PF2 - PF0)N_{ref}^2}{K_b + K_m}} \qquad \text{Eq. 13}$$

In an embodiment, pump shaft operating speed may be in a range of 23,000-27,000 rpm. At startup, the pump shaft speed starts at zero rpm. Using an adjustment factor, $S_{ratio}$, for high pressure turbine speed to pump shaft speed conversion, the general solution for high pressure turbine speed N2 as a function of fuel pressure apparatus input and output pressure is $$N2 = S_{ratio} \sqrt{\frac{(Pout - Pin)N_{ref}^2}{K_b + K_m}} \qquad \text{Eq. 14}$$

In an embodiment, N2 during operation may be in a range of 10,000-15,000 rpm. In the startup case, N2 begins at zero rpm. In the case where the $N_{ref}^2$ term has been adjusted to reflect high pressure turbine speed rather than pump shaft speed, $S_{ratio}$ may be 1. In order to determine the required input and output pressures a first pressure sensor 186 may be used to measure a pressure at the input of the fuel pressure apparatus 166 and a second pressure sensor 188 may be used to measure the output pressure of the fuel pressure apparatus 166. A processing unit 184 may be coupled to the pressure sensors 186 and 188 and used to perform the calculation of Eq. 14.

Figure 4:
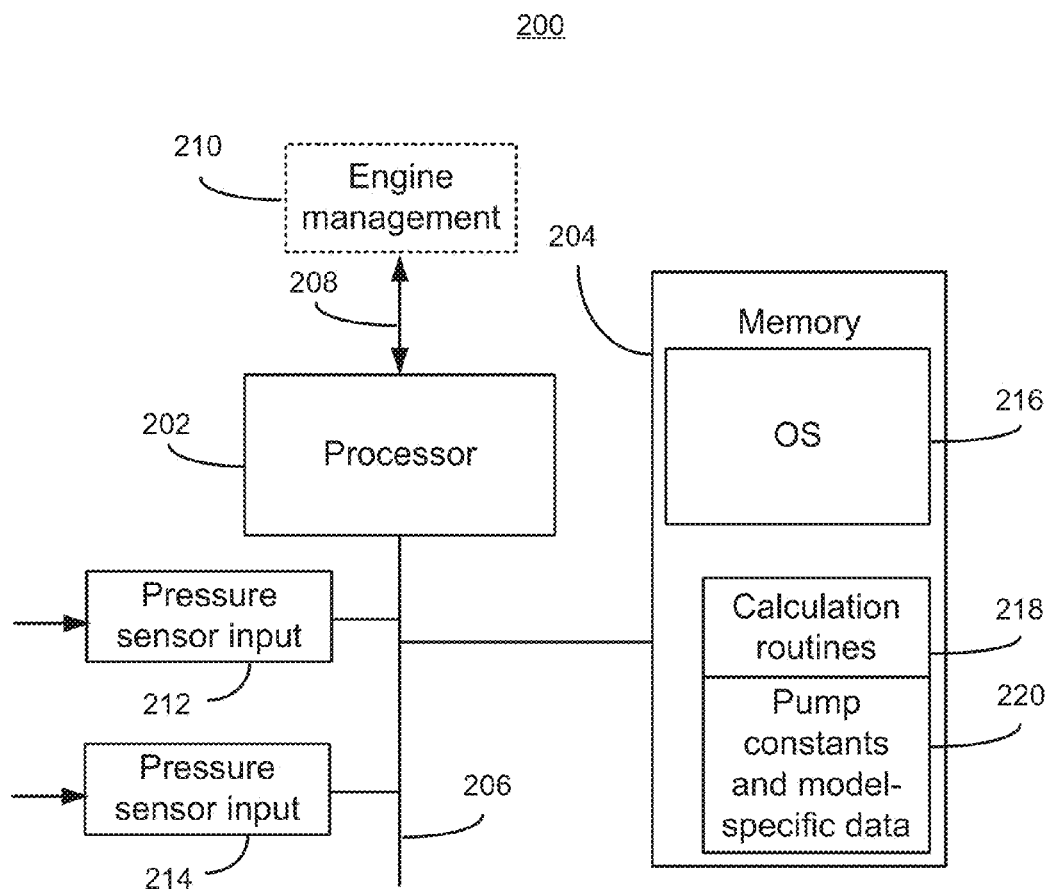
FIG. 4 is a block diagram of an exemplary processing unit.

FIG. 4 is a block diagram of an exemplary processing unit 200, the same as or similar to processing unit 184 of FIG. 3. The processing unit 200 may include a processor 202 and a memory 204 coupled by a bus 206. The memory 204 may include one or more kinds of physical volatile or nonvolatile computer-readable memory such as ROM, RAM, rotating media, flash memory, or other physical structures capable storing computer data readable by the processor 202, but does not include propagated media such as carrier waves.

The processor 202 may communicate via an external bus 208 with an external engine management controller 210. The processor 202 may also communicate via the bus 206 with a first pressure sensor input 212 coupled to first pressure sensor 186 of FIG. 3 and a second pressure sensor input 214 coupled to second pressure sensor 188, also of FIG. 3.

The memory 204 may include modules or functions that when executed by the processor 202 cause various software or hardware operations to be performed. These modules may include an operating system 216, functional code including calculation routines 218 and other data 220 including pump constants and other pump and engine model-specific data.

Figure 5:
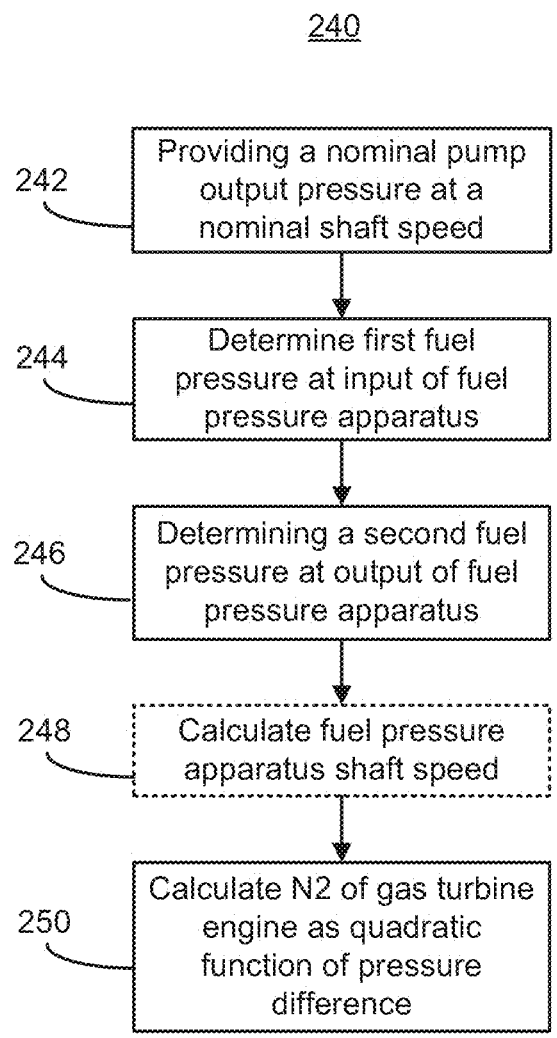
FIG. 5 is a flowchart of a method of high pressure turbine speed calculation from fuel system hydraulic pressure.

FIG. 5 is a flow chart of a method 240 of high pressure turbine speed calculation from fuel system hydraulic pressure. At block 242, characteristics of fuel pressure to shaft speed for a given fuel pressure apparatus 166 may be provided. In an embodiment, this characteristic may determined and provided by a manufacturer of a pump that is a component of the fuel pressure apparatus 166. In an embodiment, the fuel pressure apparatus 166 may be a single stage centrifugal pump. In another embodiment, the fuel pressure apparatus 166 may be a multiple stage pump including a plurality of centrifugal pumps. The pressure to shaft speed relationships for single stage and multiple stage pump configurations are shown above in Eq. 4 and Eq. 8, respectively At block 244, a first fuel pressure at an input of the fuel pressure apparatus 166 may be determined. In an embodiment, the fuel pressure may be determined by a first pressure sensor 186, shown in FIG. 3.

At block 246, a second fuel pressure at an output of the fuel pressure apparatus 166 may be determined In an embodiment, the second fuel pressure may be measured using a second pressure sensor 188, shown in FIG. 3.

At block 248, optionally, a speed of the shaft 182 may be calculated using the fuel pressure difference between the first fuel pressure and the second fuel pressure. Because the relationship between pump shaft speed and into is known, performing an intermediate calculation to determine pump shaft speed is optional. That is, calculating the speed of the high pressure turbine 174 is a function of the speed of shaft 182, and a gear ratio of a gear box 180 and the coupling between the high pressure turbine 174 and shaft 178.

At block 250, the speed of the high pressure turbine 174 may be calculated as a quadratic relationship of the input pressure of the fuel pressure apparatus and the output pressure of the fuel pressure apparatus as illustrated generally in the general case by Eq. 14.

Applications

The system and method described above address accurate determination of N2, the speed of the high pressure turbine 174 of a gas turbine engine without directly affecting the high-pressure turbine operation or relying on engine internal pressure sensing that may vary over time due to component wear. Use of this technique applies to both single and multi-stage centrifugal pumps that are driven by the high-pressure turbine and share a common drivetrain.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A method of determining a speed of a high pressure turbine in a gas turbine engine, the method comprising:
   providing a nominal output fuel pressure of a fuel pressure apparatus when the high pressure turbine is operating at a nominal speed;
   determining a first fuel pressure at an input of the fuel pressure apparatus that supplies fuel to a combustion chamber of the gas turbine engine;
   determining a second fuel pressure at an output of the fuel pressure apparatus; and
   calculating the speed of the high pressure turbine as a quadratic relationship of the first fuel pressure of the fuel pressure apparatus and the second fuel pressure of the fuel pressure apparatus.

2. The method of claim 1, wherein the fuel pressure apparatus is a single stage centrifugal pump.

3. The method of claim 2, further comprising calculating a shaft speed of the single stage centrifugal pump, wherein calculating the speed of the high pressure turbine is a function of the shaft speed and a gear ratio of a gear box coupling the high pressure turbine and the single stage centrifugal pump.

4. The method of claim 1, wherein the fuel pressure apparatus is a multiple stage pump including a plurality of centrifugal pumps.

5. The method of claim 4, further comprising driving each stage of the multiple stage pump at a common speed proportional to a gear ratio of a gear box coupling the high pressure turbine and the multiple stage pump.

6. A system for determining a speed of a high pressure turbine in a gas turbine engine, the system comprising:
   a fuel supply;
   a fuel pressure apparatus including a drive shaft, an input hydraulically coupled to the fuel supply, and an output;
   a combustion chamber of the gas turbine engine hydraulically coupled to the output of the fuel pressure apparatus;
   the high pressure turbine of the gas turbine engine mounted proximate to the combustion chamber;
   a drive unit mechanically coupling the high pressure turbine to the drive shaft of the fuel pressure apparatus; and
   a processing unit operably coupled to the input of the fuel pressure apparatus and to the output of the fuel pressure apparatus, wherein the processing unit calculates the speed of the high pressure turbine as a quadratic function of a difference of the pressure between the input and the output of the fuel pressure apparatus.

7. The system of claim 6, further comprising a metering unit hydraulically coupled between the output of the fuel pressure apparatus and the combustion chamber.

8. The system of claim 6, wherein the drive unit comprises a gear box and the processing unit calculates the speed of the high pressure turbine as a function of a gear ratio of the gear box.

9. The system of claim 6, wherein the fuel pressure apparatus comprises at least one centrifugal pump.

10. The system of claim 9, wherein the processing unit comprises a computer-readable memory that stores centrifugal pump affinity data for the at least one centrifugal pump.

11. The system of claim 10, wherein the computer-readable memory further stores an equation for the quadratic function.

12. The system of claim 11, wherein the equation for the quadratic function is $$N2 = \sqrt{\frac{(PF1 - PF0)N_{ref}^2}{K}}$$

for a single stage pump, where N2 is the high pressure turbine speed, PF0 is a fuel pressure at the input of the fuel pressure apparatus, PF1 is a pressure at the output of the fuel pressure apparatus, $N_{ref}$ is a reference speed of the high pressure turbine and K is a pump constant.

13. The system of claim 11, wherein the equation for the quadratic function is $$N2 = \sqrt{\frac{(PFn - PF0)N_{ref}^2}{K_1 + K_2 + \ldots K_n}}$$

for a multiple stage pump, where N2 is the high pressure turbine speed, PF0 is a fuel pressure at the input of the fuel pressure apparatus, PFn is a pressure at the output of a final stage of the fuel pressure apparatus, $N_{ref}$ is a reference speed of the high pressure turbine and $K_1$ to $K_n$ are pump constants for respective pump stages of the fuel pressure apparatus.

14. The system of claim 6, further comprising a first pressure sensor measuring pressure at the input of the fuel pressure apparatus and a second pressure sensor measuring pressure at the output of the fuel pressure apparatus.

15. A method implemented by a processing unit of a gas turbine engine executing instructions stored in a computer-readable memory, the method comprising:
   determining a first pressure at an input of a fuel pressure apparatus;
   determining a second pressure at an output of the fuel pressure apparatus;
   calculating a pressure difference between the input and the output of the fuel pressure apparatus;

retrieving a constant corresponding to a nominal pressure difference and a nominal high pressure turbine speed; and calculating a speed of a high pressure turbine as a quadratic function of the pressure difference and the constant.

16. The method of claim 15, wherein calculating the speed of the high pressure turbine comprises adjusting the constant by a gear ratio of a gear box that mechanically couples the high pressure turbine to the fuel pressure apparatus.

17. The method of claim 15, wherein the speed of the high pressure turbine is a square root of the pressure difference multiplied by a reference shaft speed squared divided by a pump constant.

18. The method of claim 15, wherein the fuel pressure apparatus is a single stage centrifugal pump.

19. The method of claim 15, wherein the fuel pressure apparatus is a multiple stage centrifugal pump.

\* \* \* \* \*